(12) United States Patent
Ji et al.

(10) Patent No.: US 6,596,167 B2
(45) Date of Patent: Jul. 22, 2003

(54) HYDROPHILIC HOLLOW FIBER ULTRAFILTRATION MEMBRANES THAT INCLUDE A HYDROPHOBIC POLYMER AND A METHOD OF MAKING THESE MEMBRANES

(75) Inventors: Jiang Ji, Andover, MA (US); Candeloro Dicecca, Somerville, MA (US); Mahesh J. Mehta, Needham, MA (US)

(73) Assignee: Koch Membrane Systems, Inc., Wilmington, MA (US)

( * ) Notice: Subject to any disclaimer, the term of this patent is extended or adjusted under 35 U.S.C. 154(b) by 82 days.

(21) Appl. No.: 09/817,889

(22) Filed: Mar. 26, 2001

(65) Prior Publication Data
US 2003/0015466 A1 Jan. 23, 2003

(51) Int. Cl.$^7$ .......................... B01D 71/06; B01D 71/68; B01D 71/26
(52) U.S. Cl. .............. 210/500.42; 210/500.27; 210/500.41; 210/500.36; 210/500.23; 264/41; 264/48; 264/49; 264/177.14
(58) Field of Search ............. 210/500.36, 500.41, 210/500.42, 500.27, 490, 500.23; 264/41, 48, 49, 177.14; 427/244, 245

(56) References Cited

U.S. PATENT DOCUMENTS

| | | | |
|---|---|---|---|
| 1,421,341 A | | 6/1922 | Zsigmondy et al. |
| 3,943,045 A | | 3/1976 | Cordrey et al. |
| 4,188,354 A | * | 2/1980 | Munari et al. |
| 4,384,047 A | | 5/1983 | Benzinger et al. |
| 4,690,766 A | * | 9/1987 | Linder et al. |
| 4,740,562 A | | 4/1988 | Menke et al. |
| 4,774,039 A | | 9/1988 | Wrasidlo |
| 4,776,959 A | | 10/1988 | Kasai et al. |
| 4,810,384 A | | 3/1989 | Fabre |
| 4,943,373 A | | 7/1990 | Onishi et al. |
| 5,013,339 A | | 5/1991 | Mahoney et al. |
| 5,019,261 A | * | 5/1991 | Stengaard et al. |
| 5,022,990 A | | 6/1991 | Doi et al. |
| 5,032,331 A | | 7/1991 | Onishi et al. |

(List continued on next page.)

FOREIGN PATENT DOCUMENTS

| | | |
|---|---|---|
| JP | 63 202893 A | 8/1988 |
| WO | WO 99/59707 | 11/1999 |

OTHER PUBLICATIONS

Bottino, A. et al., "Poly(vinylidene fluroide) with Improved Functionalization for Membrane Production," *Dipartimento di Chimica e Chimica Industriale, Universiti di Geneova, Via Dodecaneso 31, 1–16146 Genova, Italy*, Received Feb. 17, 1999; received in revised form Jul. 12, 1999; accepted Jul. 12, 1999, Journal of Membrane Science, 166 (2000) pp. 23–29.

(List continued on next page.)

*Primary Examiner*—Ana Fortuna
(74) *Attorney, Agent, or Firm*—Stinson Morrison Hecker LLP

(57) ABSTRACT

A hydrophilic membrane that includes a hydrophobic polymer and a water-soluble polymer-metal complex is provided. This membrane is made by heating a mixture of a hydrophobic polymer, a metal compound, and a water-soluble polymer. The water-soluble polymer forms complexes with the metal compound and homogeneously entangles with the dissolved hydrophobic polymer to form a viscous dope. The dope is extruded through an annular orifice to form a hollow fiber. The fiber is put in an environment having a controlled humidity so that it becomes partially solidified, and then, the fiber is put in a coagulation bath. The hollow fiber is formed by phase inversion in the coagulation bath and is collected using a take-up wheel that is partially immersed in a leaching bath.

23 Claims, 11 Drawing Sheets

U.S. PATENT DOCUMENTS

| | | | |
|---|---|---|---|
| 5,066,401 A | | 11/1991 | Müller et al. |
| 5,151,193 A | * | 9/1992 | Grobe et al. |
| 5,209,849 A | | 5/1993 | Hu et al. |
| 5,275,738 A | | 1/1994 | Salinaro et al. |
| 5,282,971 A | | 2/1994 | Degen et al. |
| 5,340,480 A | * | 8/1994 | Kawada et al. |
| 5,350,805 A | | 9/1994 | Lin |
| 5,418,053 A | | 5/1995 | Lin |
| 5,476,590 A | | 12/1995 | Brose et al. |
| 5,514,461 A | | 5/1996 | Meguro et al. |
| 5,531,900 A | | 7/1996 | Raghavan et al. |
| 5,565,153 A | | 10/1996 | Chidlaw et al. |
| 5,626,805 A | | 5/1997 | Meguro et al. |
| 5,643,968 A | * | 7/1997 | Andreola et al. |
| 5,736,051 A | | 4/1998 | Degen et al. |
| 5,834,107 A | | 11/1998 | Wang et al. |
| 5,914,039 A | | 6/1999 | Mahendran et al. |
| 6,146,747 A | * | 11/2000 | Wang et al. |

OTHER PUBLICATIONS

Nyström, M. et al, "Modification of Polysulfone Ultrafiltration Membranes with UV Irradiation and Hydrophilicity Increasing Agents," *Laboratory of Technical Polymer Chemistry, Department of Chemical Technology, Lappeenranta University of Technology,* P.O. Box. 20, SF–53851 Lappeenranta (Finland), Journal of Membrane Science, 66 (1991) pp. 275–296.

Wienk, I.M. et al., "Spinning of Hollow Fiber Ultrafiltration Membranes from a Polymer Blend", Received Oct. 12, 1993; revised Mar. 27, 1995; accepted Apr. 3, 1995, Journal of Membrane Science,106 (1995) pp. 233–243.

Lonsdale, H.K., "The Growth of Membrane Technology," Received Nov. 20, 1981; accepted Dec. 16, 1981, Journal of Membrane Science, 10 (1982) pp. 81–181.

Reuvers, A.J. et al., "Formation of Membranes by Means of Immersion Precipitation, Part I. A Model to Describe Mass Transfer during Immersion Precipitation," *Department of Chemical Technology, Twente University of Technology, P.O. Box 217, 7500 AE Enschede (The Netherlands),* Received Jun. 11, 1986; accepted in revised form Mar. 16, 1987), Journal of Membrane Science, 34 (1987) pp. 45–65.

Reuvers, A.J. et al., "Formation of Membranes by Means of Immersion Precipitation, Part II. The Mechanism of Formation of Membranes Prepared from the System Cellulose Acetate–Acetone–Water," *Department of Chemical Technology, Twente University of Technology, P.O. Box 217, 7500 AE Enschede (The Netherlands),* Received Jun. 11, 1986; accepted in revised form Mar. 16, 1987), Journal of Membrane Science, 34 (1987) pp. 67–86.

F. A. Cotton et al. Advanced Inorganic Chemistry, 6th Ed., John Willey and Sons, Inc., New York, 1999, Chaps. 17–E, (p 775), 17–F–6 (p 832), 17–H–4 (p 872), 18–H–7 (p 1083), Chap. 22, (p 1238).

J. F. Moulder, W. F. Stickle, P. E. Sobol, K. D. Bomben, Handbook of X–Ray Photoelectron Spectroscopy, Ed. By J. Chastain, Perkin–Elmer Corporation, Physical Electronics Division, Minnesota, USA, 1992.

Beamson, G. and Briggs, D., "High Resolution XPS of Organic Polymers", Copyright © 1992.

R.M. Boom et al., "Microstructures in phase inversion membranes. Part 2. The role of a polymeric additive*", Journal of Membrane Science, 73 (1992)277–292.

* cited by examiner

HYDROPHILIC HOLLOW FIBER ULTRAFILTRATION MEMBRANES THAT INCLUDE A HYDROPHOBIC POLYMER AND A METHOD OF MAKING THESE MEMBRANES

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

The present invention relates to a filtration membrane and a method of making this membrane. More specifically, this invention relates to a hydrophilic hollow fiber membrane that is formed from a hydrophobic polymer.

Membranes are thin-film barriers that allow certain components of a fluid mixture to selectively pass through the barriers while discriminating against the other components to achieve separation. These membranes are typically formed from polymers and are semipermeable. The specific physical shape or form of the membranes can vary, and can include flat sheets, tubular membranes, and hollow fibers. The specific use to which the membrane is to be put dictates the form selected for its construction. Membranes in the form of hollow fibers are currently used in a variety of applications, including dialysis, gas separation, ultrafiltration, microfiltration, and nanofiltration.

Polyvinylidene fluoride (PVDF) based membranes have good mechanical strength and excellent chemical stability, particularly to free chlorine attack. Unfortunately, membranes made of PVDF homopolymer are hydrophobic, and water cannot wet the surface of a hydrophobic PVDF membrane in the absence of a surfactant. Thus, the hydrophobic nature of PVDF membranes imposes an enormous resistance to water permeation to give a low water flux. In addition, hydrophobic PVDF membranes often suffer from a severe fouling problem due to non-selective absorption of solutes at the hydrophobic membrane surface to further lower permeate flux.

In order to improve the hydrophilicity of PVDF membranes and to reduce membrane fouling, chemical surface modification has been used to prepare hydrophilic PVDF based membranes. One method of modifying a PVDF membrane is by first reducing the PVDF membrane with NaOH and $NaS_2O_4$, followed by oxidizing it with NaOCl, creating a more hydrophilic membrane.

An alternative method of chemical surface modification that has been proposed involves using calcined alumina in particle form to replace NaOH to catalyze an elimination reaction of hydrofluoric acid (HF) from the PVDF backbone to give a double bond. A subsequent modification reaction is then completed by reaction either with water or with a partially hydrolyzed polyvinyl acetate so as to form a hydrophilic membrane.

Still another method of modifying the chemical surface of a PVDF polymer involves reacting PVDF powder with KOH in methanol, followed by reacting it with 98% $H_2SO_4$ to give a hydrophilic hydroxyl-containing PVDF membrane. This modified membrane has less fouling than before modification.

It has also been suggested to graft an epoxide-containing polymer to a PVDF membrane in order to improve membrane mechanical strength and hydrophilicity. Still further, grafting a polymer containing a positively charged organic phosphonium compound onto the PVDF membrane surface so as to make it more hydrophilic has also been proposed. In addition, it has been proposed to covalently bond quaternary ammonium groups to positively charged PVDF membranes. Such a membrane has been used for pharmaceutical separations. Still further, others have suggested a process for preparing hydrophilic microporous PVDF membranes by grafting a water-soluble polymer, such as polyethylene glycol dimethacrylate, to the hydrophobic membrane substrate surface by irradiation means, such as ultraviolet irradiation.

While chemical modification permanently adds hydrophilic groups to the PVDF membrane by covalent bonding, the membranes created by such modification have disadvantages. The modification reaction often has a low yield and poor reproducibility. In addition, many times toxic chemicals are used in the modification reaction. Still further, the process may be lengthy and costly.

An alternative approach to improving the hydrophilicity of PVDF membranes is to blend a hydrophilic polymer with hydrophobic PVDF. Components that can be blended with PVDF include cellulose acetate, sulfonated polysulfone, glycerol monoacetate, glycerol diacetate, glycerol triacetate, and sulfonated polyetherketone.

The polymer blend approach has a lower cost and higher efficiency than chemical modification. However, the polymer blend approach has some drawbacks. Because there is no covalent bonding between the PVDF and the hydrophilic components, it is often found that membrane performance deteriorates with time due to a gradual loss of hydrophilic components from the membrane matrix.

Another method that has been suggested is surface coating. For instance, a hydrophobic PVDF membrane may be coated with a water-insoluble vinyl alcohol-vinyl acetate copolymer. The coating layer however is more vulnerable to free chlorine attack than PVDF. Therefore, after frequent exposure to a cleaning reagent containing free chlorine, such as bleach, the hydrophilic coated membrane becomes hydrophobic.

A water-soluble polymer, such as polyvinylpyrrolidone (PVP), has not been used as a part of a polymer blend to make a hydrophilic PVDF membrane because the water-soluble polymer is washed out of the membrane by water, as is taught by U.S. Pat. No. 5,151,193. U.S. Pat. No. 5,834,107 (the '107 patent) contradicts this teaching but is technically inaccurate. If the PVDF membrane disclosed in the '107 patent contained 1–30% by weight polyvinylpyrrolidone, as claimed, then it would be hydrophilic, as represented in the '107 patent. However, the membrane of the '107 patent actually is not hydrophilic and does not contain 1–30% by weight polyvinylpyrrolidone. Evidencing the fact that this membrane is not hydrophilic, the '107 patent teaches that its membrane must be exposed to a wetting agent, such as hydroxypropylcellulose, in order to make it hydrophilic. This would not be necessary if the membrane was really hydrophilic. What actually happened in the making of the membrane of the '107 patent was that PVP was added into the membrane casting solution as a pore former and then washed out of the membrane by water in a coagulation bath during membrane formation. In fact, such a process is discussed in U.S. Pat. Nos. 5,151,193 and 4,399,035, where PVP is used as an additive to fabricate a PVDF membrane.

Still further, in the '107 patent, the membrane was cast in an environment having a relative humidity as high as 100% at 27° C., but water vapor pressure was not increased by increasing temperature. Instead, this patent discloses using a longer exposure time of the cast membrane to humid air. This is disadvantageous because longer exposure times of the cast membrane to humid air prohibits membrane production at a higher speed. For instance, if the exposure time is 2 minutes, as suggested in the '107 patent, and the membrane casting speed is 10 ft/min, it requires 20 feet of exposure space. Thus, the process of the '107 patent requires a huge capital investment to make a membrane casting machine to meet the requirement of a two minute exposure time. Furthermore, gravity will cause the extruded fiber to break before it reaches the coagulation bath if the distance between the spinneret and the coagulation bath is too long.

In order to overcome the deficiencies found with the membranes discussed above, a membrane with strength and hydrophilicity and a process for making the same are needed. More specifically, a membrane whose hydrophilic qualities are not washed away with water or bleach is needed. Still further, a process for making such a membrane that is efficient, has a good yield, and is easily reproducible is needed. In addition, a better way to control the humidity of the environment where the membrane is created is needed in order to improve the productivity of membrane manufacturing.

SUMMARY OF THE INVENTION

It is an object of the present invention to provide a hydrophilic membrane that has the mechanical strength and chemical stability of a PVDF membrane and a method of making this membrane.

It is another object of the present invention to control humidity during membrane formation so as to improve membrane structure and performance.

According to the present invention, the foregoing and other objects are achieved by a hydrophilic membrane that includes a hydrophobic polymer and a water-soluble polymer-metal complex. This membrane is made by heating a mixture of a hydrophobic polymer, an additive, and a solvent, adding a metal compound and a water-soluble polymer to the mixture, and heating and mixing the solution. The water-soluble polymer forms complexes with the metal compound and homogeneously entangles with the dissolved hydrophobic polymer to form a viscous dope. The dope is extruded through an annular orifice to form a hollow fiber. The fiber is put in an environment having a controlled humidity so that it becomes partially solidified, and then, the fiber is put in a coagulation bath. The hollow fiber is formed by phase inversion in the coagulation bath and is collected with a take-up wheel partially immersed in a leaching bath.

Additional objects, advantages, and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

DETAILED DESCRIPTION OF THE PREFERRED EMBODIMENT

The membrane of the present invention is a hydrophilic hollow fiber membrane. It includes a hydrophobic polymer as a major component and a water-soluble polymer-metal complex as a minor component. The water-soluble polymer-metal complex forms a network and uniformly entangles with the hydrophobic polymer network in the membrane matrix. The membrane of the present invention is insoluble in water, and the water-soluble polymer in the membrane cannot be removed from the membrane by water either during or after the membrane's formation.

The membrane of the present invention is made by preparing a homogenous casting solution from a hydrophobic polymer, a compatible water-soluble polymer, and at least one metal containing compound. More specifically, an additive and a hydrophobic polymer are dissolved in a solvent and mixed at an elevated temperature using a Myer mixer from Myer Engineering, Inc., 8376 Salt Lake Avenue, Bell, Calif. 90201. The additive may be lithium chloride, a metal containing compound, or polyethylene glycol. The viscous solution obtained is then mixed with an additional metal containing compound, which may but need not be a different metal containing compound, and a water-soluble polymer at an elevated temperature for a period of time sufficient to produce a brown, homogeneous and viscous solution. Alternatively, all of the metal containing compounds to be used, the hydrophobic polymer, and the water-soluble polymer may be added to the solvent at the same time and then mixed at an elevated temperature for several hours using a Myer mixer to give a brown viscous solution.

The viscous solution or dope has a viscosity of about 100 to 600,000 centipoise (cp) at about 25° C. The viscous dope, which is the membrane casting solution, is extruded through an annular orifice to form a hollow fiber. More specifically, it can be pressurized from a storage tank into a gear pump and then extruded through an annular orifice of a spinneret, generally the tube-in-orifice type, into a hollow core extrudate fiber. Internal bore fluids are often co-extruded within the hollow fiber membrane to form the bore or lumen of the hollow fiber. Following extrusion, the polymeric membranes of the present invention are formed by a phase inversion process induced by diffusion of water or water vapor from outside the hollow fiber and a bore fluid from inside the hollow fiber membranes.

Figure 1:
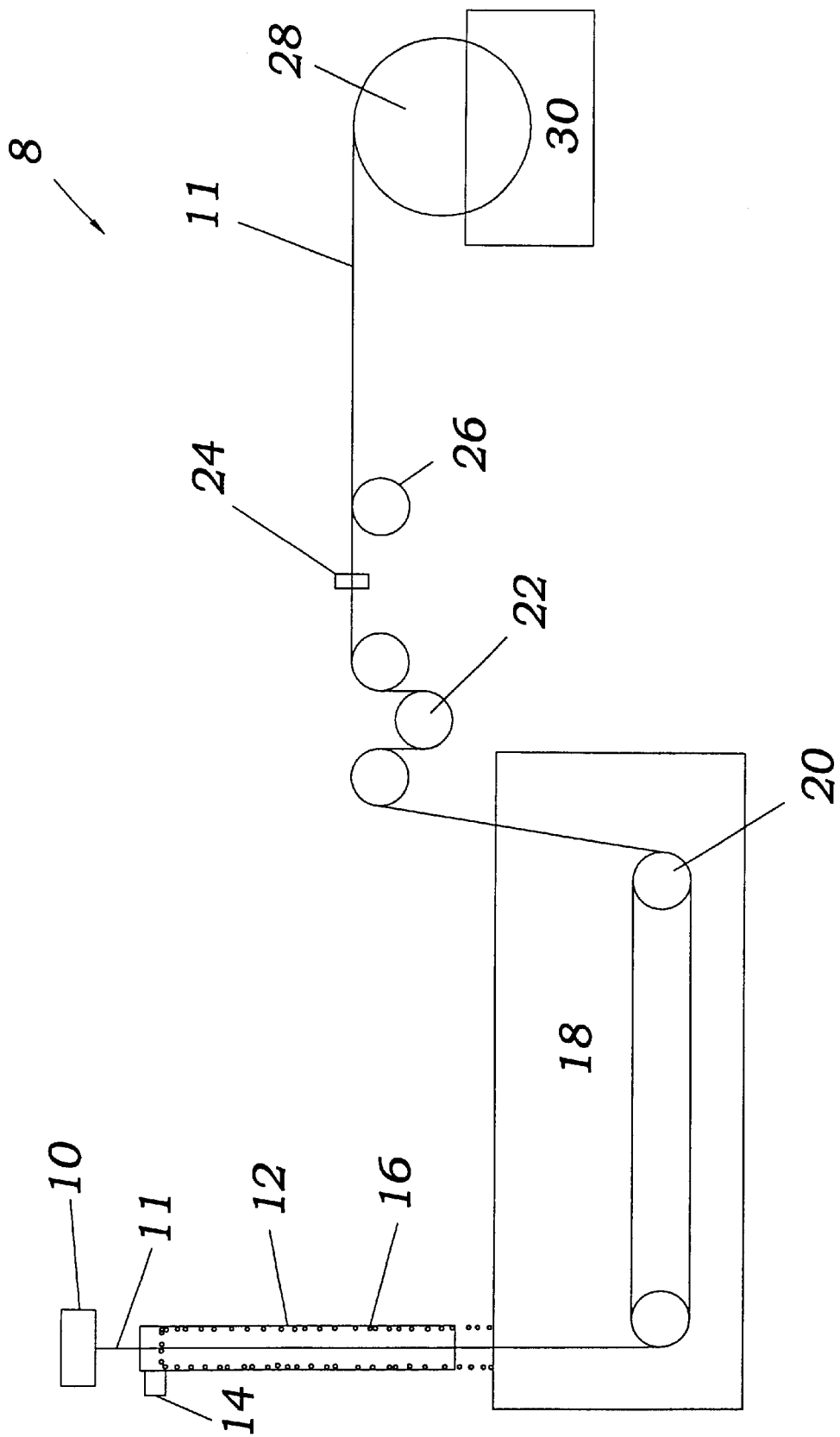
FIG. 1 is a schematic representation of a hollow fiber spinning system used in the making the membrane of the present invention.

More specifically, hollow fiber membranes may be made from the membrane casting solution using a hollow fiber spinning system, as shown in FIG. 1 and designated broadly by the numeral 8. This system includes a spinneret 10 that feeds spin fiber 11 made from the membrane casting solution to a cylindrical column 12. An inlet 14 for water is located at the top of cylindrical column 12 and causes a waterfall 16 to be formed in the interior surface of cylindrical column 12. Waterfall 16 surrounds the extruded hollow fiber 11 to provide an environment with a controlled humidity. Water from waterfall 16 enters a coagulation bath 18, and the membrane casting solution 11 is spun through coagulation bath 18 using two power driven wheels 20 that are immersed in the coagulation bath. The fiber 11 then exits the coagulation bath and is taken to a godet station 22. From there, it passes through a laser scan micrometer 24. Wheels 26 and other wheels not shown move fiber 11 along the path of the spinning system. A take-up wheel 28, which is partially immersed in a leaching bath 30, directs the extruded hollow fiber 11 into leaching bath 30. The fiber 11 wraps around take-up wheel 28 so as to be collected.

The water-soluble polymer, PVP, has a resonance structure with a negative charge localized at the oxygen atom and a positive charge localized at the nitrogen atom, as shown below.

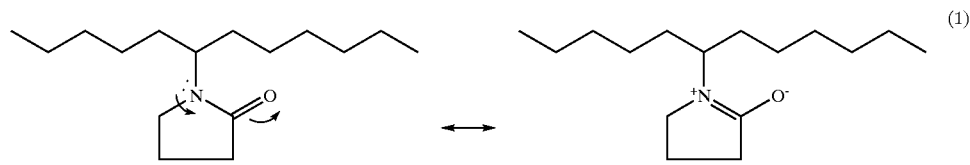

(1)

The water-soluble polymer reacts with the metal containing compound in the solution to form a water-soluble polymer-metal complex, as shown in the following reaction. The reaction shown below uses ferric chloride as the metal containing compound and PVP as the water-soluble polymer:

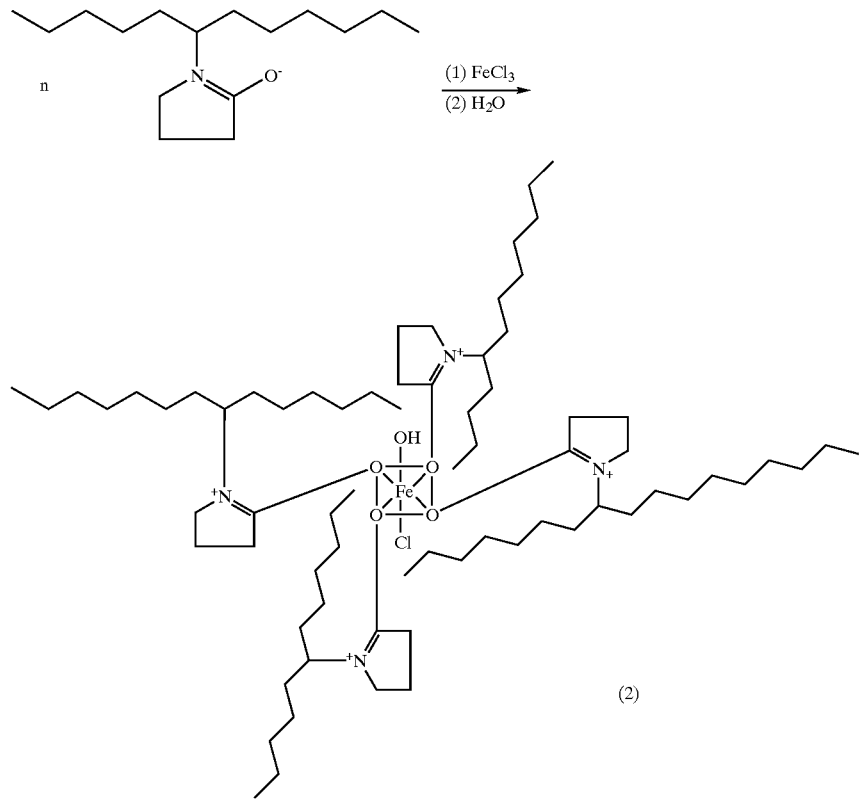

(2)

wherein n is an integer.

By using a metal containing compound in the casting solution, the water-soluble polymer is allowed to react with the metal of the metal containing compound to form a three dimensional network and uniformly interpenetrate the network of the hydrophobic polymer in the membrane casting solution. The water-soluble polymer is permanently retained in the membrane matrix to give a hydrophilic membrane.

The rate of phase inversion is controlled, at least in part, by utilizing a bore fluid and/or a coagulation bath. An internal bore fluid is co-extruded in the lumen of the fiber, helping to solidify and form the inner core of the hollow fiber membrane. The extruded hollow fiber is then passed through a bath where the solvent is replaced with a nonsolvent, such as water, and the fiber is allowed to further solidify. The membrane pore size can be regulated, at least in part by controlling the solvent content in the coagulation bath and/or in the bore fluid.

The humidity of the environment in which a membrane is cast, prior to quenching it in a coagulation bath, has a significant impact on membrane structure and performance. Before the fiber enters the coagulation bath, it is put in an environment having a controlled humidity so that the fiber becomes partially solidified. The hollow fiber is then formed by phase inversion in the coagulation bath, where solidification further takes place by mass transfer to replace the solvent with a nonsolvent.

Another aspect of the present invention is a method for controlling the impact of humidity on membrane structure and performance in the space between the spinneret and the coagulation bath. This space is referred to as the airgap. The greater the airgap the more the polymer is cured. In order to control humidity and temperature in the airgap, a casing may be used between the spinneret and the coagulation bath, allowing nitrogen to pass through a water trap to control water vapor pressure in the casing. Higher water vapor pressure is achieved using a waterfall surrounding a newly cast membrane at various temperatures. Water vapor pressure in column 12 is controlled by water temperature. The water vapor reaches equilibrium with water falling along the interior surface of the column 12. This column 12 with waterfall 16 may or may not be used when preparing fiber 11 depending upon the desired membrane structure and performance.

The airgap environment has a relative humidity of about 0 to 100% and a temperature range from about 0 to 100° C. When no water is in column 12, the humidity of the column may be between about 0 to 100%. Preferably, the humidity is about 40 to 70%. Most preferably, the humidity is about 50 to 60%. When column 12 has no water, the airgap temperature is about 5 to 35° C. Preferably, it is about 10 to 25° C. Most preferably, it is about 20 to 25° C.

When humidity is provided in column 12 through waterfall 16 at the interior surface of column 12, the column is about to obtain 100% relative humidity at various temperatures. When water trickles through column 12, the humidity is about 50 to 100%. Preferably, it is about 70 to 100%. Most preferably, is it about 80 to 100%. The water column temperature is about 0.2 to 100° C. Preferably, the water column temperature is about 20 to 100° C. Most preferably, the water column temperature is about 50 to 100° C.

The coagulation or gelation bath is comprised of 0–60% solvent and is at a temperature of about 0.2 to 100° C. Preferably, its temperature is about 20 to 80° C., and most preferably, its temperature is about 50 to 70° C.

After leaving the coagulation bath, the fibers are leached for a period of approximately 24 hours in a leaching bath comprised of a nonsolvent, such as water, in order to remove the remaining solvent from the fibers. After leaching, the fibers are placed in a glycerin and nonsolvent bath for a period of approximately 24 hours. The glycerin acts as a membrane pore radius-maintaining agent by filling the pores of the finished membrane to prevent them from collapsing during storage prior to use in a filtering device.

The leaching bath is a nonsolvent bath having a temperature of about 0.1 to 100° C. Preferably, this temperature range is between about 20 to 80° C., and most preferably, the leaching bath has a temperature of between about 50 to 70° C.

The hollow fiber is formed at a fiber spinning speed of about 5 to 300 feet per minute (ft/min). Preferably, the fiber spinning speed is about 50 to 250 ft/min. Most preferably, the fiber spinning speed is about 100 to 200 ft/min.

The hydrophobic polymer is a synthetic polymer capable of forming a film or fiber. The hydrophobic polymer may be, but is not limited to, polyvinylidene fluoride (PVDF), polysulfone, polyethersulfone, polyetherketone, polypropylene, polyethylene, or combinations thereof.

The water-soluble polymer is a polymer ligand capable of forming complexes with a variety of metals. The water-soluble polymer may be, but is not limited to, polyvinylpyrrolidone (PVP), polyvinylpyrridine, or combinations thereof.

The metal compound is an electron acceptor that is capable of forming complexes with a variety of ligands. The complexing metal may be any transitional metal such as iron, cobalt, nickel, copper, zinc, manganese, or chromium. Preferably, the metal complexing agent is ferric chloride. Preferably, the membrane of the present invention includes PVDF and an iron-PVP complex.

There are many acceptable solvents which can be used in the solution of this invention, and the solvent can be either protic or aprotic. Suitable solvents are those which are capable of solubilizing the hydrophobic polymer. The solvent in which the components of the membrane are mixed preferably is a polar solvent and may be, but is not limited to, dimethylacetamide, N-methyl-pyrrolidone (NMP), dimethyl formamide, dimethylsulfone, trialkylphosphate, or combinations thereof. The bore fluid generally comprises water, and preferably comprises a mixture of water and a portion of the same solvent initially used as the solvent in the polymer mixture. The function of the bore fluid is to assist in the formation of the fibers from the inside out, whereby the inner wall of the fiber begins to coagulate as it comes into contact with the bore fluid. As with the bore fluid, the fluid in the coagulation bath generally comprises water, and preferably comprises a mixture of water and a portion of the same solvent used in making the polymer mixture.

The membrane of the present invention is for use in filtration. This membrane is resistant to fouling and has an excellent chemical stability, particularly to chlorine attack. The hollow fibers having a separation barrier layer at the inner surface of the fiber can be operated in an inside-out flow mode, while the hollow fibers having a separation barrier layer at the outer surface of the fiber can be operated in an outside-in flow mode. This membrane can be used for microfiltration, ultrafiltration or reverse osmosis processes. Preferably, it is used for ultrafiltration. The water-soluble polymeric component of the membrane of the present invention is very stable to chlorine attack and is not washed out of the membrane matrix with water or bleach comprised of 12.5% sodium hypochlorite.

The membrane of the present invention has a tensile strength of about 200 to 700 psi. This membrane has a water flux of about 100 to 1500 gallons per square foot per day (gfd) at about 40 psi. It has a rejection towards a 150 k Dextran molecular weight marker ranging from about 5% to 99.9%. It is suitable for a variety of applications, including removal of oil from oily industrial wastewater.

As is known in the industry, fibers spun using a spinneret, such as described above, can have wall thicknesses and outer diameters according to the specifications of the spinneret utilized. According to the present invention, the hollow fiber wall thickness can be widely varied, and is preferably in the range of about 5 to about 15 mils. The outer diameter measurement can also vary widely, and preferably ranges from about 10 to about 750 mils. It is understood that these values can easily be varied to achieve the desired properties of the end product membrane. The diameter of the formed hollow fiber may be monitored using a laser scan micrometer.

In one embodiment of the present invention, no waterfall column was used to control humidity in the space between the spinneret and the gelation bath. The membrane casting solution described above was pressurized from a storage tank into a gear pump. It was in turn extruded through an annular orifice of a spinneret 10 into a fiber 11. A bore fluid was applied in a lumen to keep the fiber hollow. The extruded fiber 11 was allowed to fall freely for a certain distance from 0 to 60 inches in the airgap before reaching coagulation bath 18 containing water as a coagulating agent. The quenched fiber was wrapped several times on the two power-driven wheels 20 five feet apart in the coagulation bath 18. The bath temperature was varied between —13 to 100° C. After passing through the coagulation bath, the hollow fiber 11 was allowed to pass through a godet station 22 and a laser scan micrometer 24 to measure vertically and horizontally the outside diameter of the fiber. The fiber 11 was then collected by a take-up wheel 28, partially immersed in leaching bath 30. The fiber diameter was controlled from 2 to 200 mil depending on the needs of the membrane being created. The hollow fiber membrane formed had a yellow color due to the presence of iron in the membrane.

Figure 5:
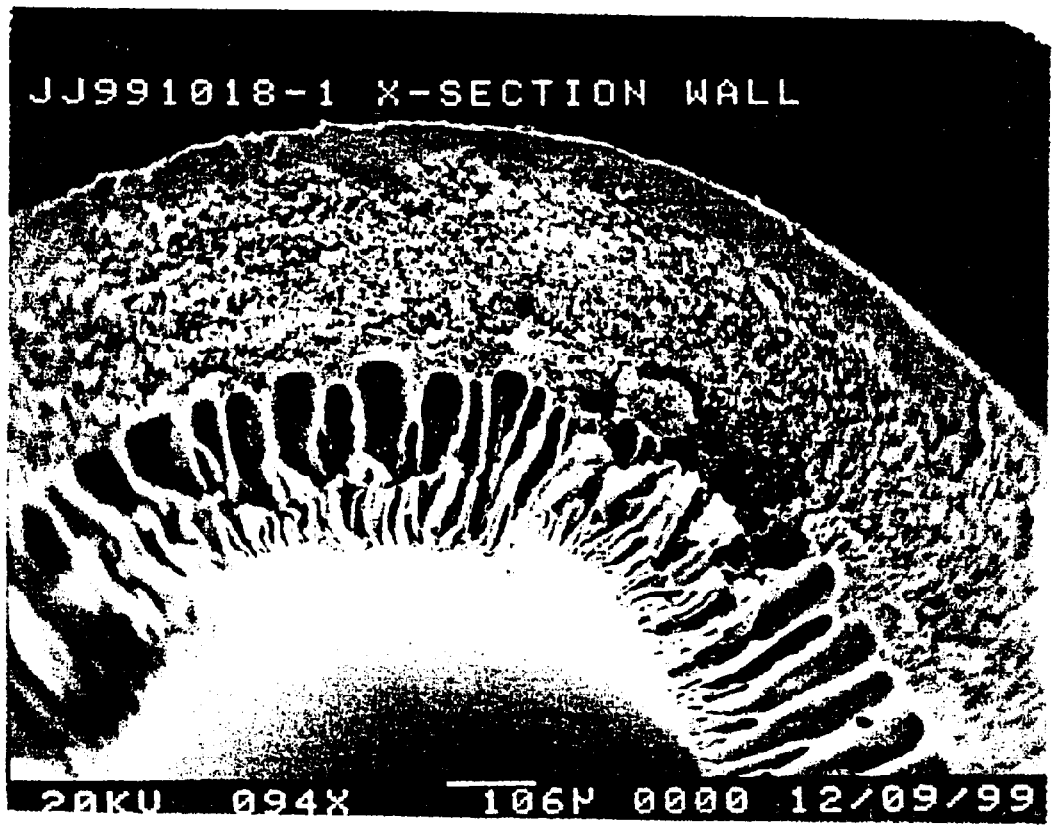
FIG. 5 is a scanning electron microphotograph of the cross section of a hollow fiber membrane obtained from the method of the present invention as outlined in Example 1.
Figure 6:
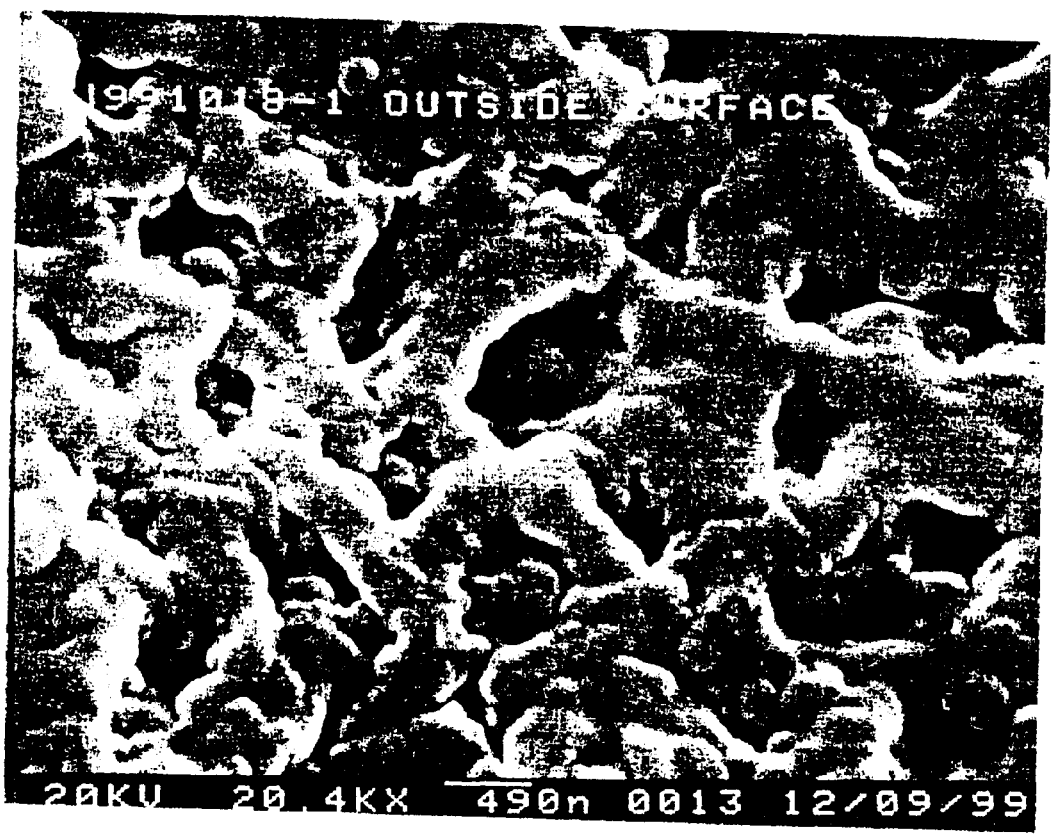
FIG. 6 is a scanning electron microphotograph of the outer surface of a hollow fiber membrane obtained from the method of the present invention as outlined in Example 1.
Figure 7:
FIG. 7 is a scanning electron microphotograph of the inner surface of a hollow fiber membrane obtained from the method of the present invention as outlined in Example 1.

Morphology of a typical hollow fiber obtained in the present invention was examined using a Scanning Electron Microscope (SEM). FIGS. 5–7 show microphotographs of a hollow fiber membrane obtained from Example 1, discussed infra, of the present invention. There are finger-like voids near the inner surface as shown in FIG. 5. The finger-like voids occupy about 40% of the cross section. There is a relatively dense layer on top of the finger-like void region to provide a good mechanical strength. This membrane has a relatively open and rough outer surface as shown in FIG. 6, and a relatively dense and smooth inner surface, as shown in FIG. 7. This is an ideal structure for an inside-out hollow fiber membrane. The smoother and tighter inner surface provides a good barrier for separation and for minimizing fouling due to physical adsorption of solutes and deposition of suspended particles in a feed solution. The rough and open outer surface allows permeation resistance to be reduced, thus increasing permeate flux.

Figure 2:
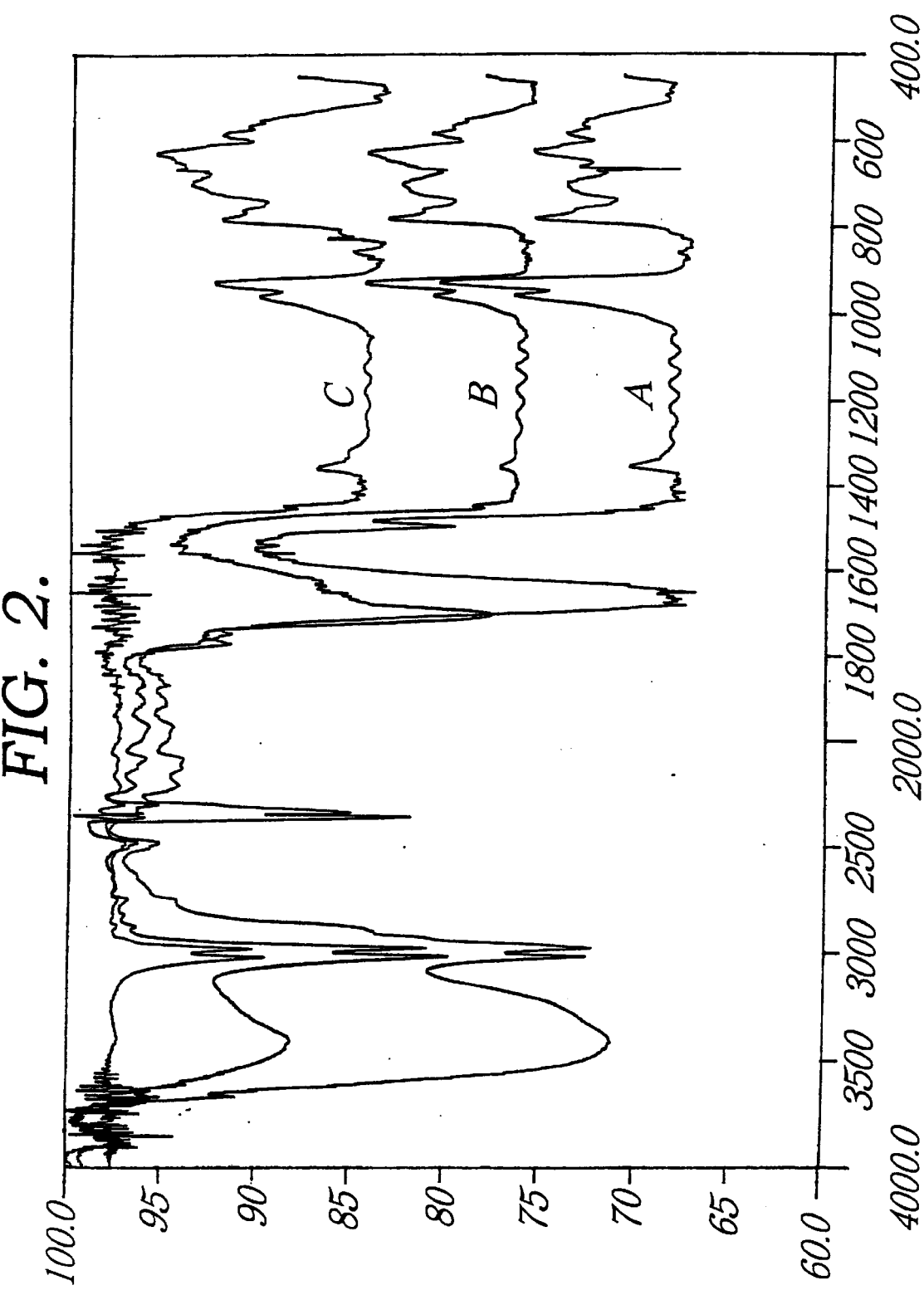
FIG. 2 is an infra-red spectra of typical hollow fiber membranes obtained by the method of the present invention.

Infrared spectra of a typical hollow fiber membrane obtained in Example 1 of the present invention is presented in FIG. 2, Spectrum A. The FT-IR spectra of the same fiber as shown in Spectrum A treated with bleach and a hollow fiber prepared from PVDF without any PVP and ferric chloride as additives in the membrane casting solution are also shown in FIG. 2, as Spectrum B and C, respectively. These three different fiber samples used to obtain the infrared spectra shown in FIG. 2 were thoroughly cleaned with reverse osmosis water and dried at 120° C. overnight before taking the infrared spectra under the same condition. Clearly, no peak was observed around 1700 $cm^{-1}$ from Spectrum C, indicating there is no carbonyl in the hollow fiber made of PVDF alone as expected. No peak was observed around 3400 $cm^{-1}$, indicating that there is no hydroxyl group in this PVDF membrane. In contrast to Spectrum C, strong peaks between 1600 and 1750 $cm^{-1}$ were observed in Spectrum A, indicating the presence of carbonyl in the membrane. In Spectrum A, a moderate peak at 1550 $cm^{-1}$ was also observed. The presence of a 1650 $cm^{-1}$ peak in Spectrum A is consistent with formation of some kind of complex between PVP and iron in the membrane. A very broad and strong peak at about 3400 $cm^{-1}$ was observed in Spectrum A, indicating the presence of hydroxyl groups in the membrane.

In order to prove whether the PVP was permanently anchored into the PVDF membrane matrix, an experiment was carried out by immersing the hollow fiber obtained from Example 1, discussed infra, into a bleach containing 12.5% (wt.) sodium hypochlorite at room temperature for one week. For comparison, a control experiment was also carried out using a polysulfone hollow fiber membrane under an identical condition described above.

After being immersed in the bleach (chlorine) for one week, the polysulfone membrane turned into a white powdery material due to the chemical degradation of polysulfone. It is well known that polysulfone is much more stable than PVP due to the presence of an electron withdrawing sulfone group in the backbone of polysulfone. If the condition used can cause polysulfone to decompose, it will definitely cause PVP to decompose. This result indicates that the condition used is adequate to show chlorine impact on the structure and performance of a membrane containing PVP as a hydrophilic component.

After being immersed in the bleach (chlorine) for one week, the membrane of the present invention was rinsed thoroughly with reverse osmosis water for 48 h, then the hollow fiber was dried and analyzed with infrared spectroscopy. AFT-IR spectrum obtained from such a chlorine treated sample shows that strong peaks between 1600 and 1750 $cm^{-1}$ remain after such a harsh treatment with bleach as displayed in Spectrum B in FIG. 2. However, the shape of the peaks in the carbonyl region of Spectrum B changed to a certain degree compared to the same region of Spectrum A in FIG. 2. The intensity (height) of the peaks around 1650 $cm^{-1}$ were reduced compared to the peaks near 1720 $cm^{-1}$, suggesting that the number of carbonyl groups associated with iron was reduced after the chlorine treatment. As a result, the peak was shifted to a slightly higher wave number attributed to the carbonyl not associated with any iron. The chlorine treatment also resulted in a change in relative intensity of a 3050 $cm^{-1}$ peak to a 2950 $cm^{-1}$ peak. In Spectrum A, a 3050 $cm^{-1}$ peak is weaker than a 2950 $cm^{-1}$ peak. After the chlorine treatment, the relative intensity of a 3050 $cm^{-1}$ peak to a 2950 $cm^{-1}$ peak is reversed and becomes the same as that observed from Spectrum C of the hollow fiber having no PVP at all, i.e., a 3050 $cm^{-1}$ peak is stronger than a 2950 $cm^{-1}$ peak in Spectra B and C. This result clearly shows that the chlorine treatment has an observable impact on chemical structure of the hollow fiber obtained in the present invention, but it is not enough to destroy the membrane. Shoulder peaks adjacent to a strong peak at 1720 $cm^{-1}$ in Spectrum B are significant.

An even more severe treatment is shown in Example 2, discussed infra. This severe treatment involved immersing the hollow fiber membrane in a bleach containing 12.5% sodium hypochlorite at a room temperature for one month, and the results showed no significant change in tensile strength of the hollow fiber (see Table 3 in Example 2). In addition, immersion of the hollow fiber obtained from Example 1 in a solution containing 200 ppm chlorine for one week showed no effect at all on the IR spectrum of the membrane. These results indicate the hollow fiber membrane obtained in this invention is very stable to chlorine attack. After the chlorine treatment, the hollow fiber remained the original yellow color, suggesting the presence of iron in the membrane. The results discussed above suggest that the remarkable stability of the hollow fiber membrane obtained in the present invention is related to the presence of iron in the membrane, because positively charged iron has an ability to withdraw electrons and thus stabilize the membrane.

Figure 3:
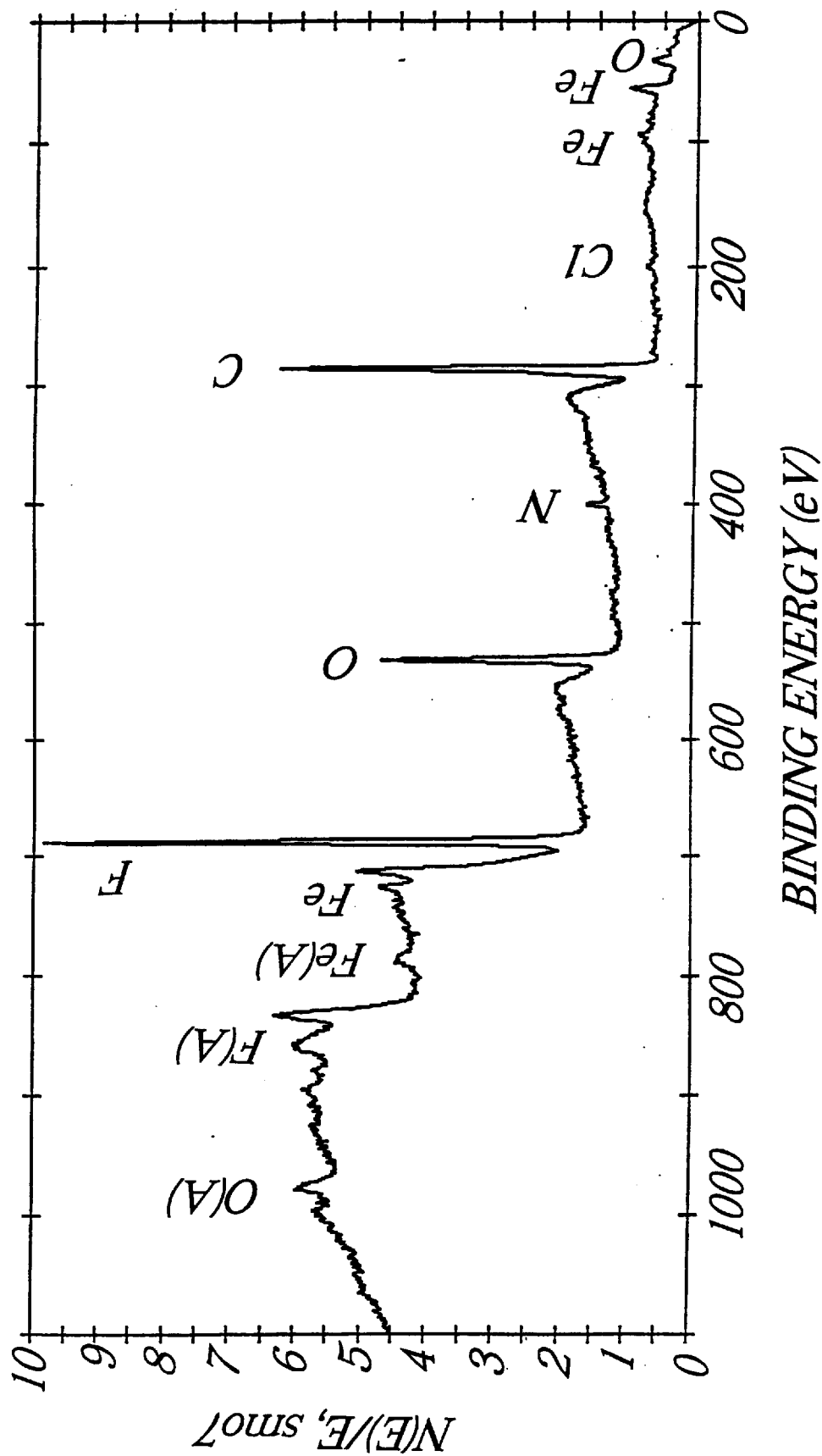
FIG. 3 is an Electron Spectroscopy for Chemical Analysis (ESCA) spectrum of a hollow fiber membrane obtained from the method of the present invention is outlined in Example 1.

A broad and moderate peak at about 3400 cm$^{-1}$ was also observed in Spectrum B, indicating the presence of hydroxyl groups in the membrane. The samples used for obtaining Spectrum A, B, and C in FIG. 2 were prepared together under an identical condition, and the spectra were also taken together under the same conditions. Although these three membrane samples were exposed to the same atmosphere, the intensities of hydroxyl band observed at about 3400 cm$^{-1}$ in FIG. 3 are quite different. The intensity of 3400 cm$^{-1}$ peak has the following order for these three membranes, A>B>C, suggesting that the membrane having Spectrum A has more hydroxyl groups than the others in FIG. 2, thus it is more hydrophilic than the chlorine treated membrane, as displayed in Spectrum B. This finding is consistent with the water flux data shown in Table 3 of Example 2, discussed infra. The membrane without PVP-metal complexes (Spectrum C) is simply hydrophobic.

In order to confirm the presence of iron in the membrane, the hollow fiber obtained in Example 1 was analyzed by ESCA. A typical ESCA spectrum of a hollow fiber obtained from Example 1 is shown in FIG. 3. A signal detected at a binding energy of 711 ev was attributed to 2p electron of iron, clearly indicating the presence of iron at the membrane surface. The chlorine treated samples having Spectrum B in FIG. 2, were also analyzed by ESCA along with the hollow fiber prepared from PVDF alone as a control. Surface compositions of the hollow fiber membranes obtained from ESCA are given in Table 1.

TABLE 1

| Surface Composition | PVDF Hollow Fiber[a] | Fe/PVP/PVDF Hollow Fiber[b] | Fe/PVP/PVDF Hollow Fiber[c] | Fe/PVP/PVDF Hollow Fiber[d] |
|---|---|---|---|---|
| C | 51.86 | 55.27 | 48.68 | 48.99 |
| O | 7.04 | 13.94 | 11.70 | 6.12 |
| F | 38.29 | 22.86 | 32.88 | 42.75 |
| N | 2.08 | 1.67 | 0.94 | 0.24 |
| Fe | 0 | 5.29 | 5.13 | 1.42 |
| S | 0.05 | 0.17 | 0.12 | 0 |
| Cl | 0.11 | 0.66 | 0.48 | 0.27 |
| Na | 0.50 | 0.08 | 0 | 0.14 |
| Ca | 0.05 | 0.06 | 0.06 | 0.06 |
| TOTAL | 100 | 100 | 99.99 | 99.99 |

[a]Hollow fiber membrane prepared from PVDF alone.
[b]Hollow fiber membrane obtained from Example 1.
[c]Hollow fiber membrane obtained in Example 1 was immersed in an aqueous solution containing 200 ppm sodium hypochlorite at room temperature for one week.
[d]Hollow fiber membrane obtained in Example 1 was immersed in an aqueous solution containing 12.5% wt. sodium hypochlorite at room temperature for one week.

As expected the atomic percentage of iron is zero at the surface of the hollow fiber membrane prepared from the PVDF alone without ferric chloride and PVP as additives. But, it is unexpected to detect oxygen and nitrogen at the surface of the hollow fiber membrane. The reason for this is not fully understood at this point in time. In contrast, the atomic percentage of iron is 5.29% at the surface of a hollow fiber membrane prepared from PVDF with ferric chloride and PVP as additives. A post treatment of the membrane with an aqueous solution containing 200 ppm sodium hypochlorite has a negligible effect on the iron concentration at the membrane surface but a significant effect on the surface concentrations of carbon, fluoride, oxygen and nitrogen. It should be noticed that the ratio of oxygen to nitrogen in the hollow fibers prepared from ferric chloride, PVP and PVDF (Fe/PVP/PVDF) is much higher than that in the fiber prepared from PVDF alone. For a hollow fiber of the present invention prepared from ferric chloride, PVP and PVDF, the atomic percentage of iron at the membrane surface remained as high as 1.42% even after a severe post treatment by immersing the membrane in a pure bleach containing 12.5% wt. sodium hypochlorite at room temperature for a week. This result suggests that the iron is strongly associated with the membrane and plays a crucial role to make the membrane stable to chlorine attack, which is consistent with the ESCA result. The fiber color, the ESCA spectra and the quantitative analysis on concentration of iron, nitrogen and oxygen are consistent with the infrared spectra of the hollow fiber membranes discussed above, indicating the presence of iron and PVP in the PVDF based hollow fiber membrane. The iron has three positive charges ($Fe^{3+}$), PVP itself is soluble in water, thus the presence of PVP and $Fe^{3+}$ in the membrane matrix provides the membrane with a hydrophilic surface.

Carbonyl and nitrogen in an amide are good ligands which can form complexes with a variety of metals. Based on the infrared spectra in FIG. 2, the ESCA spectrum in FIG. 3, and the data in Table 1, a complex formed from iron and PVP is shown in reaction (2), supra. Polyvinylpyrrolidone, in which only one pyrrolidone moiety is drawn, has a resonance structure, with a negative charge located at the oxygen atom of the carbonyl group. It can behave as a good ligand to form a complex with iron as shown in reaction (1). The hydroxyl ligand of the iron complex proposed in reaction (2) is consistent with the broad peak at about 3400 cm$^{-1}$ in Spectrum A and B in FIG. 2. The coordination of a carbonyl group with iron is consistent with the peak at 1650 cm$^{-1}$ in Spectrum A, in FIG. 2. The intensity change of the peak at 1650 cm$^{-1}$ and a shift of carbonyl stretching vibration observed in Spectrum B to a slightly higher wave number after a chlorine treatment is consistent with the complex shown in reaction (2). The chlorine treatment may alter the nature of PVP-iron complex, thus resulting in changes in IR spectrum at 1650 cm$^{-1}$, 1550 cm$^{-1}$, 1720 cm$^{-1}$, 2950 cm$^{-1}$, 3050 cm$^{-1}$ and 3400 cm$^{-1}$, respectively.

Chlorine resulting as a ligand is consistent with the ESCA data presented in Table 1. The Cl concentration at the membrane surface is between 0.27% and 0.66%. The signals at 529.7 eV and 711.0 eV detected by high resolution ESCA are consistent with the presence of Fe—O bonding, as shown in reaction (2). Only one of the possible complexes is shown by reaction (2). The number of oxygen ligands may vary between 1 and 6. These oxygen ligands can be from different PVP macromolecules or from a single PVP macromolecule because one PVP molecule has many pyrrolidone moieties. If ligands from different PVP molecules form a complex with iron, crosslinking between different PVP macromolecules will take place to form a network which can entangle with other networks formed from PVDF macromolecules. Therefore, after formation of a membrane from a dope of the present invention, water-soluble PVP will be permanently anchored in the PVDF matrix by formation of complexes with iron to give a hydrophilic membrane, which has been proven stable to chlorine attack. In the present invention the condition used for chlorine treatment of the membrane was intensified using a pure bleach containing 12.5% wt. sodium hypochlorite. Usually, less than 200 ppm sodium hypochlorite is used for cleaning a membrane. A control experiment with 200 ppm sodium hypochlorite showed no effect at all on the IR spectrum and separation performance of the membrane developed in this invention.

Any metal which can form complexes with a water-soluble polymer can be used to anchor the water-soluble polymer into a hydrophobic polymer matrix. In the present invention, iron was used as an example to illustrate the present invention. It is not meant to limit the scope of the present invention. Transition metals and other metals having vacant valent orbitals, neutral or charged, can be used to replace iron. In fact, any water-soluble polymer or even a small molecule which is capable of forming a stable complex with any metal can be used to replace PVP. Also, PVDF can be replaced with any other hydrophobic polymer, such as polysufone, polyethersulfone, polypropylene, polyethylene, and polyetherketone. The key of the present invention is the formation of stable complexes of water-soluble polymers with metals and the compatibility between the complexes and hydrophobic polymers.

In another embodiment of the present invention, hollow fiber membranes were prepared using the equipment shown in FIG. 1 with cylindrical column 12, to control airgap humidity. Water was introduced from the inlet, at the top of the cylindrical column 12, to form a waterfall 16, at the interior surface of the column surrounding the extruded hollow fiber, to provide an environment with a controlled humidity. Water vapor pressure in the column was controlled by water temperature. The water vapor reached equilibrium with water falling along the interior surface of the column. Controlled in this way, the relative humidity inside the column was 100%, but the absolute vapor pressure was varied with water temperature. A viscous polymer solution extruded from the top of the column was allowed to pass through the entire length of the column before entering coagulation bath 18. The extruded viscous solution became partially solidified due to exposure to water vapor during the course of passing through the center of the column 12 having a waterfall 16 at the inside surface. Then the fiber was allowed to travel back and forth several times between two power driven rollers 20, in the coagulation bath, before winding on a take-up wheel 28, partially immersed in a leaching bath 30. The diameter of hollow fiber was monitored using a laser scan micrometer 24. The temperatures of the coagulation bath 18 and leaching bath 30 were varied between 0 to 100° C. The fiber diameters were varied between 5 and 200 mil. The hollow fiber membranes were prepared at 5 to 300 ft/min. The length of the cylindrical column 12 was varied from 1 to 200 inches. The diameter of the column 12 was varied from 1 to 12 inches. Therefore, the water vapor pressure used in the present invention was higher than that used in U.S. Pat. No. 5,834,107. Because the extruded fiber is very close to the waterfall 16, the mass transfer in the present invention is much more efficient than that in the prior art. As a result, the exposure time of the extruded membrane to humid air is significantly reduced so as to give a higher productivity.

Figure 9:
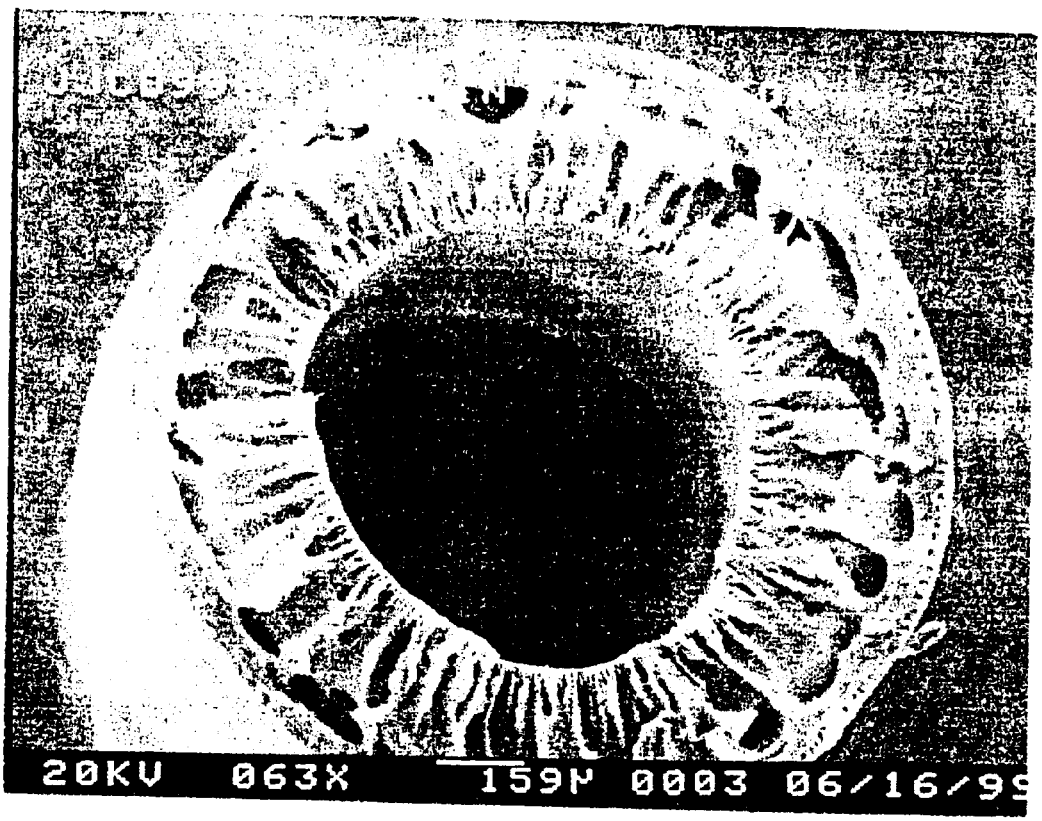
FIG. 9 is a scanning electron microphotograph of a hollow fiber membrane obtained from the method of the present invention as outlined Example 8.
Figure 10:
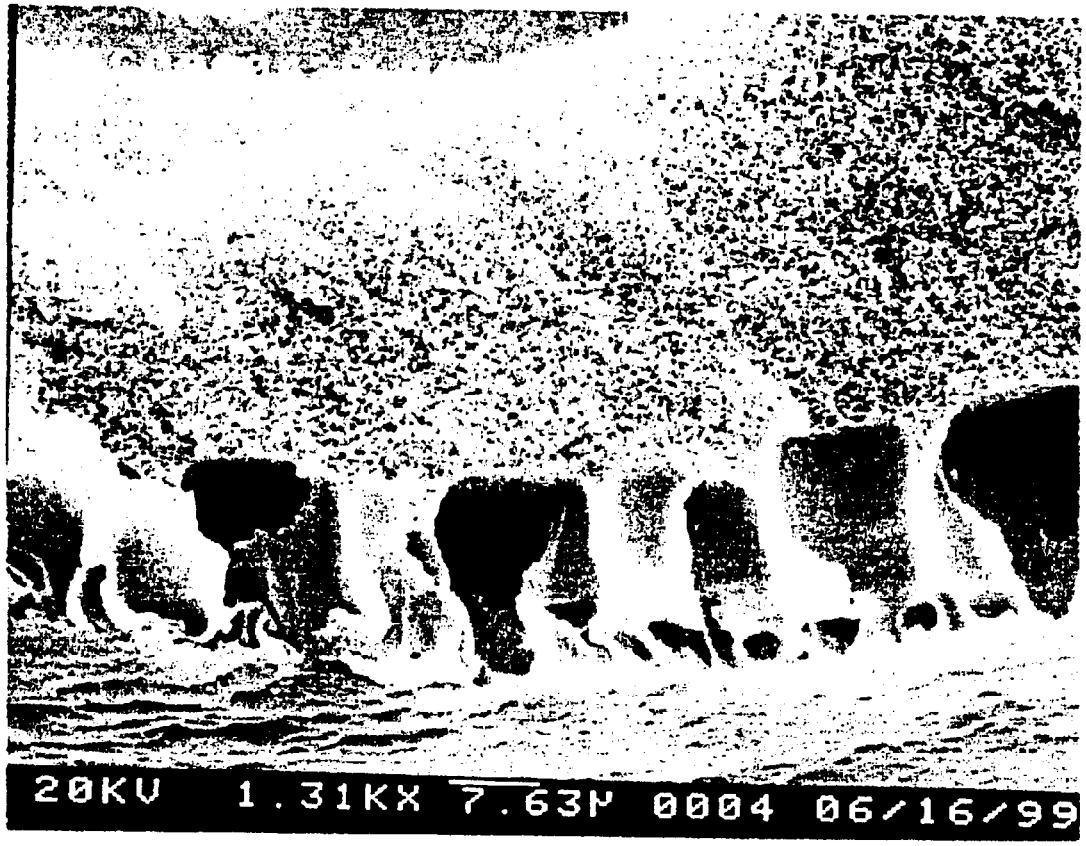
FIG. 10 is a scanning electron microphotograph of a hollow fiber membrane obtained from the method of the present invention as outlined Example 8.
Figure 11:
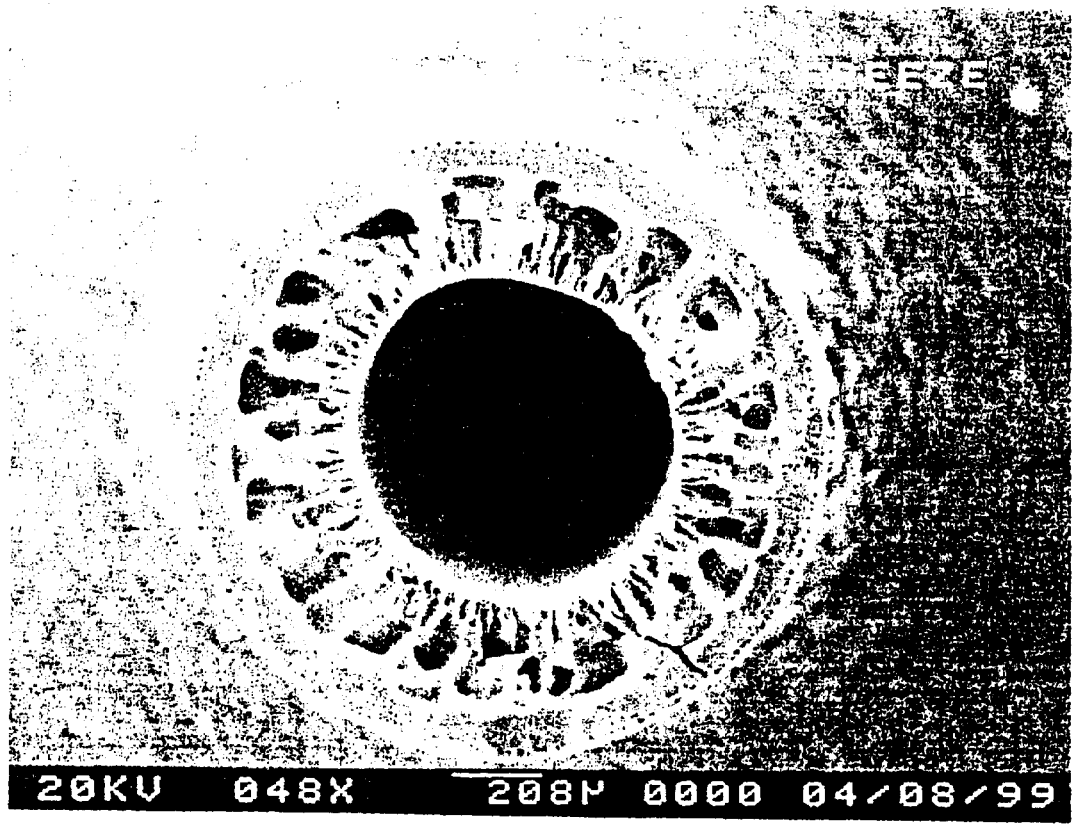
FIG. 11 is a scanning electron microphotograph of a hollow fiber membrane obtained from the method of the present invention as outlined Example 9.

Finger-like voids near the outer surface induced by diffusion of water vapor are much smaller than those induced by diffusion of water near the inner surface, resulting in a dense support layer near the outer surface of the hollow fiber as shown in FIGS. 9–11. Such a support layer provides a better mechanical strength than a layer in the center of the cross section and has less resistance to water permeation from an inside-out permeate flow.

The following are examples of methods for making membranes of the present invention. These examples are not meant in any way to limit the scope of this invention.

EXAMPLE 1

To a 2 gallon mixer was added 8.3 lb. of dope containing 1.91 lb. of Kynar (trade name of polyvinylidene fluoride (PVDF) manufactured by ELF Atochem North America, Inc., 2000 Market St., Philadelphia, Pa. 19103, U.S.A.), 5.98 lb. of dimethyl acetamide (DMAc) and 0.42 lb. of lithium chloride. The dope was stirred for about 1 hour until its temperature reached 47° C. Then, 0.17 lb. of ferric chloride and 0.97 lb. of PVP K15 (15,000 wt. ave. molecular weight polyvinylprrolidone) were added to the dope. This mixture was stirred at 60° C. for 4 hours, then degassed under vacuum to give a brown viscous dope. This dope was allowed to stand still at 47° C. for at least 24 hours before use.

The dope prepared above was extruded into a hollow fiber using the equipment shown in FIG. 1 without column 12. The fiber spinning conditions used and the characteristics of the hollow fiber obtained are shown in Table 2. The dope described above was pressurized into a gear pump, and it was in turn extruded through an annular orifice of a spinneret into a fiber. Water, as a bore fluid, was applied in the lumen to keep the fiber hollow. The extruded fiber was allowed to fall freely for 15 in. in the airgap before reaching a coagulation bath containing water as a coagulating agent. The quenched fiber was wrapped three times back and forth on two power-driven wheels five feet apart in the coagulation bath. The bath temperature was set at 50° C. After passing through the coagulation bath, the hollow fiber was allowed to pass through a godet station and a laser scan micrometer to measure vertically and horizontally the outside diameter of the fiber. The fiber was then collected by a take-up wheel, partially immersed in a leaching water bath. The hollow fiber membrane was spun at 15 ft/min. The hollow fiber membrane obtained had a yellow color due to the presence of iron in the membrane. The fiber was further leached with water overnight, then preserved in an aqueous solution containing 30% wt. glycerol, and finally dried in an oven at 50° C. for 24 hours.

TABLE 2

| Fiber spinning conditions | |
|---|---|
| Dope extrusion rate (rpm) | 10 |
| Flow rate of bore fluid (water) (ml/min) | 9.5 |
| Fiber spinning speed (ft/min) | 15 |
| Airgap (in.) | 15 |
| Fiber characteristics | |
| Fiber outside diameter (mil) | 89.3 |
| Fiber inside diameter (mil) | 46.5 |
| Membrane thickness (mil) | 21.4 |
| Tensile strength (psi) | 385 |
| Bubble point (psi) | 98 |
| Pure water flux at 40 psi (gfd) | 567 |
| Rejection toward 150 k Dextran (150,000 m.w.) | 95% |

The major characteristics of the hollow fiber membrane obtained in Example 1 of the present invention are displayed in Table 2. The outside diameter (OD) of the hollow fiber is 89.3 mil, inside diameter (ID) is 46.5 mil and thickness is 21.4 mil. This fiber has a tensile strength of 385 psi, a bubble point of 98 psi measured with water as a wetting agent. The pure water flux is 567 gfd at 40 psi. The membrane also shows a rejection of 95% towards a Dextran marker having an average molecular weight of 150,000 Dalton.

Figure 4:
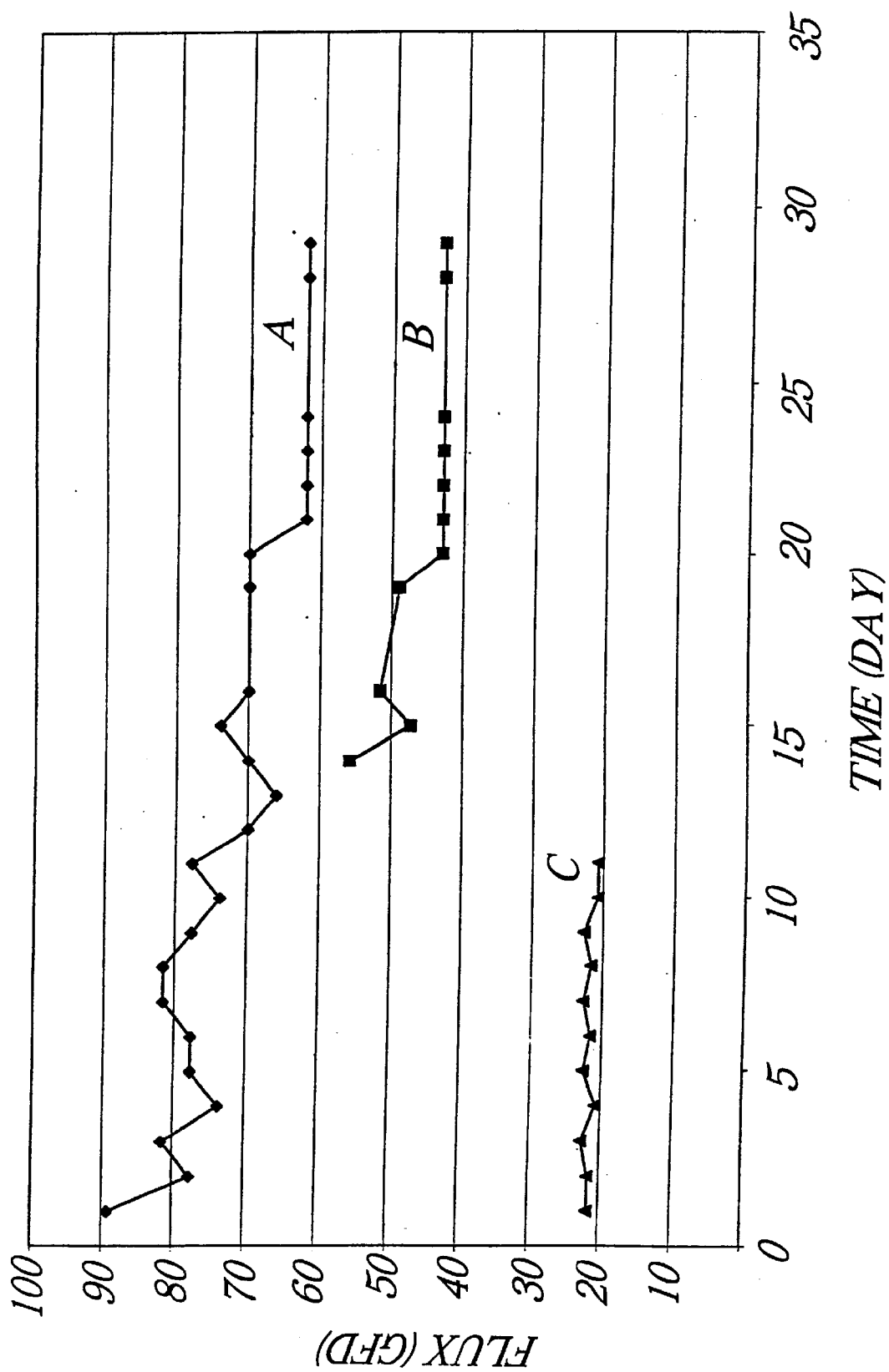
FIG. 4 is a plot showing permeate flux of hollow fiber membranes of the present invention as a function of time.

The fouling behavior of the hollow fiber obtained in Example 1 of the present invention was studied by measuring oily water flux as a function of time. The cartridges of 1"×25" were used for this study. The feed solution, consisting of 5% 10W30 motor oil, 10% mineral oil, and 85% used cutting oil (2% oil, 10% surfactant and 88% water) obtained from Koch Membrane Systems, Inc. (KMS), was circulated at 40° C. The oily water flux was measured at an inlet pressure of 30 psi and an outlet pressure of 20 psi. The result obtained is presented in FIG. 4. Curve A in FIG. 4 is the hollow fiber membrane obtained in Example 1, which has an oil removal rate of 98.8%. Curve B is a commercial hollow fiber membrane, namely CM50 of Koch Membrane Systems, Inc., prepared from polyacrylonitrile, which shows an oil removal rate of 98.4%. And Curve C is a hollow fiber membrane prepared from PVDF without the complex shown in reaction (2). The membrane shown in Curve C has a similar oil removal rate to other two membranes, shown in Curves A and B in FIG. 4, but much lower flux. It can be seen clearly from FIG. 4 that the hollow fiber membrane obtained in Example 1, Curve A, has a permeate flux three times as high as that of the membrane obtained from PVDF without the complex shown in reaction (2). The membrane of the present invention, Curve A, also shows a higher flux than a commercial membrane of KMS, Curve B, developed earlier for oily water treatment. This result clearly shows that the membrane of the present invention has a remarkable improvement in permeate flux in oily water treatment. This superior performance is attributed to the presence of the PVP-iron shown in reaction (2) or a similar complex in the membrane, which significantly increases the hydrophilicity of the membrane and gives a higher water flux in oily wastewater treatment.

EXAMPLE 2

The same dope and spinning conditions as in Example 1 were used to prepare a hollow fiber. The fiber spinning conditions used and the characteristics of the hollow fiber obtained are given in Table 3. The obtained fiber was first impregnated with an aqueous solution containing 30% wt. glycerol, then dried in air at room temperature.

TABLE 3

| Fiber spinning conditions | | |
| --- | --- | --- |
| Dope extrusion rate (rpm) | 10 | |
| Flow rate of bore fluid (water) (ml/min) | 9.5 | |
| Fiber spinning speed (ft/min) | 15 | |
| Airgap (in.) | 15 | |
| Fiber characteristics | | |
| Post treatment | No | Yes* |
| Fiber outside diameter (mil) | 88.6 | 86.7 |
| Fiber inside diameter (mil) | 46.5 | 46.8 |
| Membrane thickness (mil) | 21.1 | 20.0 |
| Tensile strength (psi) | 349 | 395 |
| Pure water flux at 40 psi (gfd) | 999 | 341 |
| Rejection (150 k Dextran) | 94% | 76% |

*The hollow fiber was immersed in a bleach containing 12.5% sodium hypochlorite at room temperature for one month before test.

The hollow fiber membrane of Example 2 was prepared under the same conditions as in Example 1. However, no post treatment at an elevated temperature was applied to the fiber in Example 2, thus giving a higher water flux of 999 gfd at 40 psi across the membrane as displayed in Table 3, column 2. A post treatment by immersing the fiber in a bleach containing 12.5% sodium hypochlorite at room temperature for one month shows no significant change in fiber tensile strength. However, both the flux and rejection decreased compared to those of untreated fiber. This result is consistent with the infrared spectrum shown in Spectrum B, in FIG. 2 and ESCA data in Table 1. The decreases in both water flux and rejection are likely due to alteration of the PVP-iron complex at the membrane surface by chlorine treatment. However, a post treatment with 200 ppm chlorine showed no effect at all on the same PVDF membrane. A control experiment with polysulfone hollow fiber showed that the polysulfone hollow fiber became a powdery material after being exposed to the same bleach containing 12.5% sodium hypochlorite at room temperature for a week due to chemical degradation of the polysulfone. This result indicates that the hydrophilic PVDF membrane of the present invention is much more stable to free chlorine attack than the polysulfone membrane.

EXAMPLE 3

The same dope as in Example 1 was extruded using the equipment shown in FIG. 1 without column 12. The hollow fiber membrane obtained had a yellow color due to the presence of iron in the membrane. The fiber was further leached with water overnight, then preserved in an aqueous solution containing 30% wt. glycerol, and finally dried in air at room temperature. The spinning conditions used and the characteristics of the hollow fiber obtained are shown in Table 4.

TABLE 4

| Fiber spinning conditions | |
| --- | --- |
| Dope extrusion rate (rpm) | 10 |
| Flow rate of bore fluid (water) (ml/min) | 9.5 |
| Fiber spinning speed (ft/min) | 20 |
| Airgap (in.) | 39.5 |
| Fiber characteristics | |
| Fiber outside diameter (mil) | 77.8 |
| Fiber inside diameter (mil) | 32.2 |
| Membrane thickness (mil) | 22.8 |
| Tensile strength (psi) | 291 |
| Pure water flux at 40 psi (gfd) | 385 |
| Rejection (150 k Dextran) | 83% |

In Example 3, increasing airgap to 39.5 inches while maintaining the other parameters basically the same allows a hollow fiber to be obtained having a lower rejection of 83% towards 150 k Dextran and a lower water flux of 385 gfd at 40 psi than the fiber obtained in Example 1. Thus, this invention provides a useful method of control rejection in a small increment. This result is very important to the fractionation of macromolecules having a broad molecular weight distribution.

EXAMPLE 4

10 lb. of dope containing 2.30 lb. of Kynar (PVDF), 0.05 lb. of lithium chloride and 7.2 lb. of DMAc was added to a 2 gallon mixer, to which 1.0 lb. of PVP K15 and 0.20 lb. of ferric chloride were added while stirring. This mixture was further stirred at 60° C. for 4 hours, then degassed under vacuum to give a brown dope. This dope was allowed to stand still at 47° C. for at least 24 hours before use.

A hollow fiber membrane was prepared from the above dope using the equipment shown in FIG. 1 without column 12. The hollow fiber was extruded at 15 ft/min. The distance between the spinneret and the water bath (the air gap) was 1.0 in. The temperature of the water bath and leaching bath was 50° C. Water was used as a bore fluid. The rest of the spinning conditions used and the characteristics of the hollow fiber membrane obtained are given in Table 5.

TABLE 5

| Fiber spinning conditions | |
|---|---|
| Dope extrusion rate (rpm) | 5 |
| Flow rate of bore fluid (water) (ml/min) | 9.5 |
| Fiber spinning speed (ft/min) | 10 |
| Airgap (in.) | 1.0 |
| Fiber characteristics | |
| Fiber outside diameter (mil) | 84.8 |
| Fiber inside diameter (mil) | 55.6 |
| Membrane thickness (mil) | 14.6 |
| Tensile strength (psi) | 365 |
| Pure water flux at 40 psi (gfd) | 1364 |
| Rejection (150 k Dextran) | 68.9% |

EXAMPLE 5

The same dope as in Example 1 was extruded using the equipment shown in FIG. 1 without column 12. The spinning conditions used and the characteristics of the hollow fiber obtained are shown in Table 6.

TABLE 6

| Fiber spinning conditions | |
|---|---|
| Dope extrusion rate (rpm) | 5 |
| Flow rate of bore fluid (water) (ml/min) | 9.5 |
| Fiber spinning speed (ft/min) | 10 |
| Airgap (in.) | 15 |
| Fiber characteristics | |
| Fiber outside diameter (mil) | 84.9 |
| Fiber inside diameter (mil) | 44.6 |
| Membrane thickness (mil) | 20.2 |
| Tensile strength (psi) | 290 |
| Bubble point (psi) | 80 |
| Pure water flux at 40 psi (gfd) | 833 |
| Rejection (150 k Dextran) | 55.4% |

EXAMPLE 6

The same dope in Example 1 was extruded using the equipment shown in FIG. 1 without column 12. The spinning conditions used and the characteristics of the hollow fiber obtained are displayed in Table 7.

TABLE 7

| Fiber spinning conditions | |
|---|---|
| Dope extrusion rate (rpm) | 5 |
| Flow rate of bore fluid (water) (ml/min) | 9.5 |
| Fiber spinning speed (ft/min) | 12 |
| Airgap (in.) | 39.5 |
| Fiber characteristics | |
| Fiber outside diameter (mil) | 78.3 |
| Fiber inside diameter (mil) | 33.9 |
| Membrane thickness (mil) | 22.2 |
| Tensile strength (psi) | 218 |
| Pure water flux at 40 psi (gfd) | 650 |
| Rejection (150 k Dextran) | 66.3% |

The impact of dope extrusion rate on membrane performance is demonstrated by Examples 4, 5, and 6. Comparing these examples with Examples 1, 2 and 3, the fibers in Examples 4, 5, and 6 were extruded at a lower rate. In addition, the airgap in Examples 4, 5, and 6 was also varied from 1.0 to 39.5 inches.

Figure 8:
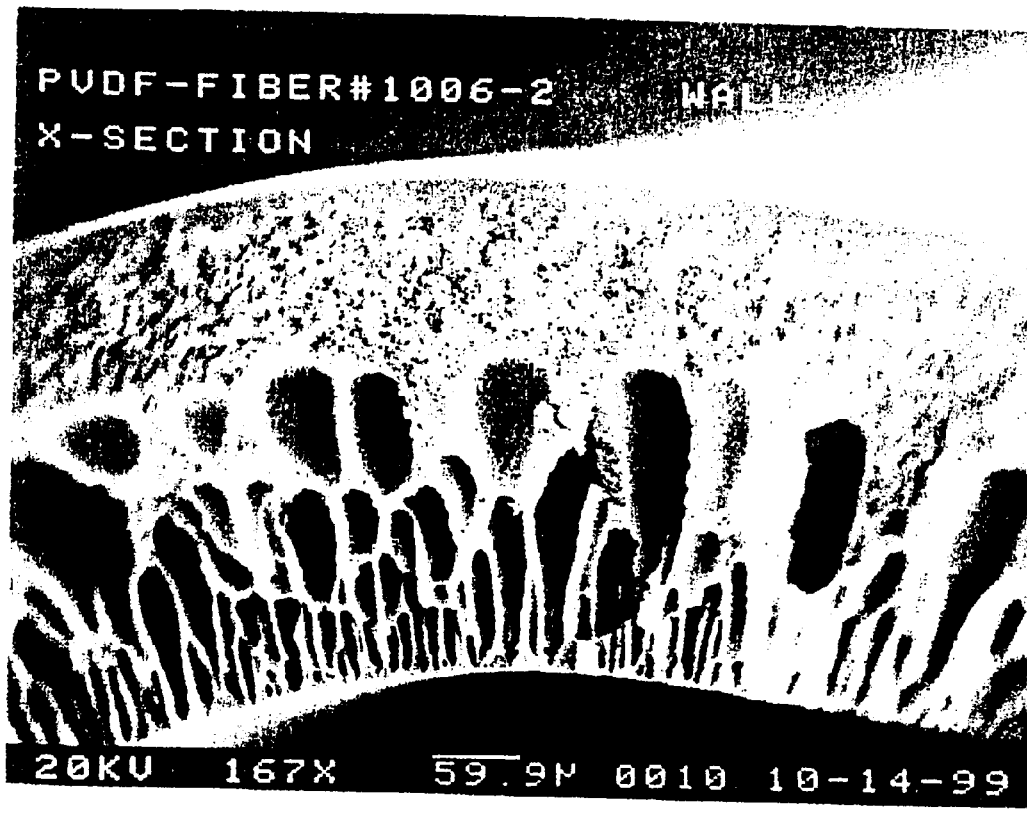
FIG. 8 is a scanning electron microphotograph of a hollow fiber membrane obtained from the method of the present invention as outlined in Example 4.

In Example 4, a thin wall (14.6 mil) fiber was prepared at a dope extrusion rate of 5 rpm using a short airgap of 1.0 inch. A cross sectional view of the hollow fiber is shown in FIG. 8. Compared to FIG. 5, a similar finger-like void layer near the interior surface was observed, which is supported by a relatively dense layer near the exterior surface. However, the finger voids in FIG. 8 are bigger than those in FIG. 5, and occupy about 60% of the cross-section, thus to give a higher flux of 1364 gfd at 40 psi. Comparing FIG. 8 with FIG. 5, the present invention provides an effective method to control the size of finger-like voids in the cross-section of hollow fiber membranes. The hollow fiber obtained in Example 4 has a tensile strength of 365 psi and a rejection of 68.9% for 150 k Dextran molecular weight marker as shown in Table 5.

Increasing the airgap to 15 in. in Example 5 while maintaining the other parameters unchanged during fiber manufacturing resulted in a hollow fiber having a wall thickness of 20.2 mil, giving a lower water flux of 833 gfd and a rejection of 55.4%, as shown in Table 6. Further increasing the airgap to 39.5 in. in Example 6 while maintaining the other parameters basically unchanged resulted in a hollow fiber having an even lower water flux than the fiber obtained in Example 5. The details are given in Table 7. The data in Tables 5, 6 and 7 clearly shows that the use of a longer airgap resulted in not only a lower water flux across the membrane but also a lower tensile strength. This finding is consistent with those obtained in Examples 1 and 3 using a higher dope extrusion rate of 10 rpm. However, a higher dope extrusion rate gives a higher rejection of Dextran marker than a lower dope extrusion rate.

EXAMPLE 7

2.33 lb. of DMAc, 0.71 lb. of PVP K15 and 0.11 lb. of ferric chloride were added to a 1 gallon glass kettle, then stirred until all solid components dissolved to give a brown colored solution. This solution was, in turn, added into a 2 gallon mixer containing 1.63 lb. of Kynar (PVDF), 0.36 lb. of lithium chloride and 5.11 lb. of DMAc. The mixture was stirred at 60° C. for 4 hours, then degassed under vacuum to give a brown viscous dope, which was allowed to stand still at 47° C. for at least 24 hours before use.

A hollow fiber membrane was prepared from the above dope using the equipment shown in FIG. 1 without column 12. The spinning conditions used and the characteristics of the hollow fiber obtained are given in Table 8.

TABLE 8

| Fiber spinning conditions | |
|---|---|
| Dope extrusion rate (rpm) | 10 |
| Flow rate of bore fluid (water) (ml/min) | 9.5 |
| Fiber spinning speed (ft/min) | 27 |
| Airgap (in.) | 15 |

TABLE 8-continued

Fiber characteristics

| | |
|---|---|
| Fiber outside diameter (mil) | 66.7 |
| Fiber inside diameter (mil) | 33.5 |
| Membrane thickness (mil) | 16.6 |
| Tensile strength (psi) | 238 |
| Bubble point (psi) | >30 |
| Pure water flux at 40 psi (gfd) | 860 |
| Rejection (150 k Dextran) | 96% |

The impact of polymer concentration in a dope on membrane performance is illustrated in Example 7. Compared to Example 2, the hollow fiber was spun at a speed of 27 ft/min, almost twice as high as the speed used in Example 2. The fiber obtained also has a similar water flux and rejection compared to the fiber obtained in Example 2. The PVDF polymer concentration in the dope of Example 7 is about 25% less than that of Example 2. This finding is important because it provides a method to fabricate a hollow fiber membrane having a similar separation performance at a higher productivity and using less polymer material compared to Example 2.

EXAMPLE 8

14.0 lb. of Solef® PVDF 1015/1001 from Solvay Polymers, Inc. of Houston, Tex., 4.59 lb. of PVP K15, 0.61 lb. of ferric chloride and 1.22 lb. of aluminum chloride were added to a 50 gallon mixer containing 79.5 lb. of N-methylpyrrolidone (NMP), then stirred until all solid components completely dissolved to give a brown colored viscous dope, which was allowed to stand still at 50° C. for at least 24 hours before use.

A hollow fiber membrane was prepared from the above dope using the equipment shown in FIG. 1 with column 12. Water was introduced into the column from the top, as shown in FIG. 1, to form a waterfall along the inside surface of the column. The dope prepared above was pressurized into a gear pump. It was in turn extruded through an annular orifice of a spinneret into a fiber. Water, as a bore fluid, was applied in the lumen to keep the fiber hollow. The extruded fiber was allowed to fall through the center of the column surrounded by the waterfall before reaching a coagulation bath containing water as a coagulating media. The quenched fiber was wrapped three times back and forth on two power-driven wheels five feet apart in the coagulation bath. The bath temperature was set at 50° C. After passing the coagulation bath, the hollow fiber was allowed to pass through a godet station and a laser scan micrometer to measure vertically and horizontally the outside diameter of the fiber. The fiber was then wound up by a take-up wheel partially immersed in a leaching water bath. The hollow fiber membrane was spun at 25 ft/min. The hollow fiber membrane obtained had a yellow color due to the presence of iron in the membrane. The fiber was further leached with water overnight, then preserved in an aqueous solution containing 30% wt. glycerol, and finally dried in air at room temperature. The rest of the spinning conditions used and the characteristics of the hollow fiber obtained are shown in Table 9.

TABLE 9

Fiber spinning conditions

| | |
|---|---|
| Dope extrusion rate (rpm) | 5 |
| Flow rate of bore fluid (water) (ml/min) | 8.7 |
| Fiber spinning speed (ft/min) | 25 |
| Waterfall length (in.) | 38 |
| Waterfall temperature (° C.) | 28 |

Fiber characteristics

| | |
|---|---|
| Fiber outside diameter (mil) | 55.1 |
| Fiber inside diameter (mil) | 31.6 |
| Membrane thickness (mil) | 11.7 |
| Tensile strength (psi) | 190 |
| Bubble point (psi) | 20 |
| Pure water flux at 20 psi (gfd) | 229 |
| Rejection (150 k Dextran) | 94% |

A cross sectional view of the hollow fiber obtained in Example 8 is shown in FIG. 9. There is a large finger-like void layer near the inner surface of a hollow fiber, a small finger-like void layer near the outer surface, and a dense layer between the two finger-like void layers. An enlarged view of the cross section near the outer surface is given in FIG. 10. It clearly shows a dense layer underneath a small finger-like void layer near the outer surface. The small finger-like voids near the outer surface were formed by phase inversion induced by the diffusion of water vapor, while the large finger-like voids near the inner surface were formed by phase inversion induced by the diffusion of water in the lumen. Clearly, the driving forces for a diffusion induced phase inversion in the lumen is greater than that outside the fiber. Thus, the hollow fiber obtained is asymmetric having a dense layer near the outer surface. This structure is different from that of U.S. Pat. No. 4,399,035 where the double skinned hollow fiber has a dense layer in the center of the cross section and is symmetrically sandwiched with two finger-like void layers. The hollow fiber obtained in Example 8 has a tensile strength of 190 psi, a water flux of 229 gfd at 20 psi across membrane pressure and a rejection of 94% towards Dextran having an average molecular weight of 150k Dalton.

EXAMPLE 9

1.0 lb. of Solef® PVDF 1015/1001, 0.33 lb. of PVP K15, 0.044 lb. of ferric chloride, and 0.088 lb of aluminum chloride were added to a 1 gallon glass kettle containing 5.72 lb. of NMP. The mixture was stirred until all solid components completely dissolved to give a brown colored dope, which was allowed to stand still for at least 24 hours before use.

A hollow fiber membrane was prepared from the above dope using the equipment shown in FIG. 1 with column 12. Water was introduced into the column from the top as shown in FIG. 1 to form a waterfall along the inside surface of the column. The spinning conditions used and the characteristics of the hollow fiber obtained are shown in Table 10.

TABLE 10

Fiber spinning conditions

| | |
|---|---|
| Dope extrusion rate (rpm) | 10 |
| Flow rate of bore fluid (water) (ml/min) | 5.0 |
| Fiber spinning speed (ft/min) | 40 |
| Waterfall length (in.) | 38 |
| Waterfall temperature (° C.) | 50 |

TABLE 10-continued

| Fiber characteristics | |
|---|---|
| Fiber outside diameter (mil) | 55.6 |
| Fiber inside diameter (mil) | 26.6 |
| Membrane thickness (mil) | 14.5 |
| Tensile strength (psi) | 230 |
| Bubble point (psi) | 60 |
| Pure water flux at 30 psi (gfd) | 146 |
| Rejection (150 k Dextran) | 92% |

A SEM of the fiber obtained is shown in FIG. 11. The fiber structure is quite similar to that shown in FIG. 9, but the dense layer between the two finger-like void regions in FIG. 11 is thicker than that in FIG. 9, to give a higher tensile strength and a lower water flux at a similar rejection level. Therefore, comparing FIG. 11 with FIG. 9, the present invention once again demonstrates a novel and effective method to control membrane flux by controlling the finger-like structure in the cross section of hollow fiber membranes using a cylindrical waterfall surrounding the extruded hollow fiber.

The microvoid layer is on one side of the hollow fiber obtained using the no waterfall embodiment of Examples 1 to 7, as a result of the use of water in the lumen and a relatively low humidity outside the extruded fiber. The hollow fibers obtained using the waterfall embodiment of Examples 8 and 9 indeed have two different finger-like void layers with the finger-like voids near the outer surface being much smaller than those near the inner surface and a dense layer between the two finger-like void layers is located near the outer surface. This is due to the use of water in the lumen and water vapor outside the extruded fiber.

EXAMPLE 10

The dope was prepared under the same condition as that described in Example 1. The hollow fiber was also prepared in a similar way to that described in Example 1 except at a much higher speed. The detailed conditions used are given in Tables 11 and 12, respectively. The hollow fibers formed were tested with the permeate flowing from outside to inside the fibers.

TABLE 11

| Fiber spinning conditions | |
|---|---|
| Dope extrusion rate (rpm) | 30 |
| Bore fluid (NMP/water = 90/10 vol.) (ml/min) | 0.4 |
| Fiber spinning speed (ft/min) | 200 |
| Airgap (in.) (humidity: 36% at 25° C.) | 15 |
| Water bath temperature (° C.) | 50 |
| Fiber characteristics | |
| Fiber outside diameter (mil) | 17.9 |
| Fiber inside diameter (mil) | 10.2 |
| Membrane thickness (mil) | 3.85 |
| Tensile strength (psi) | 653 |
| Pure water flux at 15 psi (gfd) | 30.4 |
| Rejection (150 k Dextran) | 62.9% |

The outside-in hollow fiber illustrated in Table 11 was prepared at 200 ft/min and tested with the permeate flowing from outside to inside the hollow fiber to give a water flux of 30 gfd at 15 psi and 63% rejection towards 150 k Dextran.

TABLE 12

| Fiber spinning conditions | |
|---|---|
| Dope extrusion rate (rpm) | 30 |
| Bore fluid (NMP/water = 90/10 vol.) (ml/min) | 0.4 |
| Fiber spinning speed (ft/min) | 300 |
| Airgap (in.) (humidity: 36% ° C.) | 15 |
| Water bath temperature (° C.) | 50 |
| Fiber characteristics | |
| Fiber outside diameter (mil) | 14.8 |
| Fiber inside diameter (mil) | 8.6 |
| Membrane thickness (mil) | 3.1 |
| Tensile strength (psi) | 681 |
| Pure water flux at 15 psi (gfd) | 19.9 |
| Rejection (150 k Dextran) | 66.9% |

A similar fiber to that disclosed in Table 11 was also obtained at an even higher speed of 300 ft/min, as shown in Table 12.

From the foregoing, it will be seen that this invention is one well adapted to attain all the ends and objects hereinabove set forth together with other advantages which are obvious and which are inherent to the process and composition. It will be understood that certain features and subcombinations are of utility and may be employed without reference to other features and subcombinations. This is contemplated by and is within the scope of the claims. Since many possible embodiments of the invention may be made without departing from the scope thereof, it is to be understood that all matter herein set forth is to be interpreted as illustrative and not in a limiting sense.

We claim:

1. A hydrophilic hollow fiber membrane comprising:
   a hydrophobic polymer; and
   a water-soluble polymer transition metal complex entangled with said hydrophobic polymer, wherein said water-soluble polymer is selected from the group consisting of polyvinylpyrrolidone, polyvinylpyrridine, and combinations thereof.

2. The membrane of claim 1, wherein said membrane has a tensile strength of about 200 to 700 psi.

3. The membrane of claim 1, wherein said membrane has a water flux of about 100 to 1500 gfd at about 40 psi.

4. The membrane of claim 1, wherein said membrane has a rejection towards a 150 k Dextran molecular weight marker ranging from about 5% to 99.9%.

5. The membrane of claim 1, wherein said hydrophobic polymer is a synthetic polymer capable of forming a film or fiber and is selected from the group consisting of polyvinylidene fluoride, polyetherketone, polypropylene, polyethylene, and combinations thereof.

6. The membrane of claim 1, wherein said membrane is comprised of polyvinylidene fluoride and a polyvinylpyrrolidone and iron complex.

7. The membrane of claim 1, wherein said membrane is an ultrafiltration membrane.

8. The membrane of claim 1, wherein said water-soluble polymeric component is permanently anchored in said hydrophobic polymer membrane matrix.

9. The membrane of claim 1, wherein said water-soluble polymeric component cannot be washed out of said membrane matrix with water or bleach comprised of 12.5% sodium hypochlorite.

10. A method of making a hydrophilic hollow fiber membrane, comprising:
    mixing a hydrophobic polymer and a solvent to form a mixture;

heating said mixture to form a solution;

adding a transition metal compound and a water-soluble polymer is selected from the group consisting of polyvinylpyrrolidone, polyvinylpyrridine, and combinations thereof to said solution;

heating and mixing said solution, wherein said water-soluble polymer forms complexes with said transition metal containing compound and homogeneously entangles with said dissolved hydrophobic polymer to form a viscous dope; and extruding said dope through an annular orifice to form a hollow fiber.

11. The method of claim 10, further comprising:

feeding said fiber into a coagulation bath, wherein said fiber is formed by phase inversion in said coagulation bath.

12. The method of claim 11, further comprising:

feeding said fiber through an environment having a controlled humidity so that said fiber becomes partially solidified before said fiber enters said coagulation bath.

13. The method of claim 11, further comprising:

collecting said hollow fiber with a take-up wheel partially immersed in a leaching bath.

14. The method of claim 13, wherein said leaching bath is comprised of a nonsolvent and has a temperature of about 0.1 to 100° C.

15. The method of claim 13, wherein said hollow fiber is formed at a rate of about 5 to 300 ft/min.

16. The method of claim 11, wherein said coagulation bath is comprised of about 0% to 60% v/v of said solvent and is at a temperature of 0 to 100° C.

17. The method of claim 10, wherein said heating steps (b) and (d) take place at a temperature from 0° C. to the boiling point of the solvent, allowing said dope to be mixed under the reflux of the solvent.

18. The method of claim 10, wherein said viscous dope has a viscosity of about 100 to 600,000 centipoise (cp) at about 25° C.

19. The method of claim 10, wherein said environment has a relative humidity of 0 to 100% and a temperature range from 0 to 100° C.

20. The method of claim 19, wherein said humidity is provided by a column having a waterfall at the interior surface of said column and wherein said column maintains between about 50 to 100% relative humidity at various temperatures.

21. The method of claim 10, wherein said solvent is a polar solvent.

22. The method of claim 21, wherein said polar solvent is selected from the group consisting at dimethyl acetamide, N-methyl pyrrolidone, dimethyl formamide, dimethylsulfone, trialkylphosphate, and combinations thereof.

23. The method of claim 10, wherein said metal containing compound is comprised of an electron acceptor that is capable of forming complexes with a variety of ligands.

* * * * *